US007844061B2

(12) United States Patent
Chen et al.

(10) Patent No.: US 7,844,061 B2
(45) Date of Patent: Nov. 30, 2010

(54) SPEAKER SYSTEM OF UTILIZING PULSE WIDTH MODULATION SIGNALS FOR SAVING IDLING POWER CONSUMPTION

(75) Inventors: Ming-Hsiung Chen, Taipei (TW); Shang-Shu Chung, Taipei (TW); Ming-Chung Li, Taipei (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 997 days.

(21) Appl. No.: 11/620,730

(22) Filed: Jan. 8, 2007

(65) Prior Publication Data

US 2008/0118092 A1 May 22, 2008

(30) Foreign Application Priority Data

Nov. 20, 2006 (TW) .............................. 95220427 U

(51) Int. Cl.
*H02B 1/00* (2006.01)

(52) U.S. Cl. .......................... 381/123; 381/111; 330/10

(58) Field of Classification Search ................. 381/123, 381/111, 80, 81; 330/10, 251, 207 A
See application file for complete search history.

(56) References Cited

U.S. PATENT DOCUMENTS 5,767,740 A * 6/1998 Fogg ........................... 330/10
6,778,011 B2 * 8/2004 Noro et al. .................... 330/10
7,102,405 B2 * 9/2006 Hisamoto et al. ........... 327/172
2004/0125968 A1 * 7/2004 Pearce et al. ................ 381/120

* cited by examiner

*Primary Examiner*—Vivian Chin
*Assistant Examiner*—Con P Tran
(74) *Attorney, Agent, or Firm*—Winston Hsu; Scott Margo

(57) ABSTRACT

In a speaker system, pulse width modulation signals are utilized for driving said speaker system, and duty cycles of both left audio channel signals and right audio channel signals of an earphone in said speaker system are modulated by said pulse width modulation signals. When the left audio channel or the right audio channel of the earphone has no inputted audio signals with the abovementioned modulated duty cycles, the speaker system may be prevented from unnecessary power consumption. Besides, audio signals from both the left audio channel and the right audio channel of the earphone and outputted from the speaker system may thus be synchronized further by both the pulse width modulation signals and a sawtooth wave source for generating said pulse width modulation signals, for reducing noise and increasing an output audio quality of the speaker system. The abovementioned speaker system is preferably utilized for a Class D amplifier.

5 Claims, 5 Drawing Sheets

SPEAKER SYSTEM OF UTILIZING PULSE WIDTH MODULATION SIGNALS FOR SAVING IDLING POWER CONSUMPTION

BACKGROUND OF THE INVENTION

1. Field of the Invention

The present invention relates to a speaker system, and more particularly, to a speaker system of utilizing pulse width modulation signals for saving idling power consumption.

2. Description of the Prior Art

A conventional stereo earphone is equipped with two audio channels and driving by a corresponding signal source. Both the audio channels are respectively utilized for providing sounds for the left ear and the right ear of users so that said both audio channels may be denoted as a left ear channel and a right ear channel. The corresponding signal source is utilized for driving an earphone driver. An operating amplifier may further be provided for each of the left ear channel, the right ear channel, and the corresponding signal source, for enhancing amplitudes of respective signals. An electrical level of the corresponding signal source is conventionally ½ VCC, where VCC indicates an electrical level of a bias voltage for biasing an audio amplifier, which generates audio signals of both the left ear channel and the right ear channel and may be a Class D amplifier. However, since an appropriate synchronizing mechanism is not provided among the left earphone, the right earphone, and the corresponding signal source, noise is easily generated by non-synchronism among the left earphone, the right earphone, and the corresponding signal source. Moreover, since an appropriate analog ground is not provided either, the noise cannot be discharged so that related audio quality is reduced. Besides, when there are no audio signals in both the left ear channel and the right ear channel, a waste in power consumption is led by continuously utilizing the corresponding signal source for driving the speaker.

SUMMARY OF THE INVENTION

The present invention provides a speaker system of utilizing pulse width modulation signals for saving idling power consumption. The speaker system comprises a first signal source, a first comparator having a positive input terminal coupled to the first signal source, a second signal source coupled to a negative input terminal coupled to the first comparator, a first audio input source, a first switch having a first terminal coupled to the first audio input source, a first mixer having a first input terminal coupled to a second terminal of the first switch, a second comparator having a positive input terminal coupled to the first signal source, and a negative input terminal coupled to an output terminal of the first mixer, a second switch having a first terminal coupled to the second signal source, and a second terminal coupled to a second input terminal of the first mixer, a third switch having a first terminal coupled to the second signal source, a second audio input source, a fourth switch having a first terminal coupled to the second audio input source, a second mixer having a first input terminal coupled to a second terminal of the fourth switch, and a second input terminal coupled to a second terminal of the third switch, a third comparator having a positive input terminal coupled to the first signal source, and a negative input terminal coupled to an output terminal of the second mixer, a first speaker having a first input terminal coupled to an output terminal of the first comparator, and a second input terminal coupled to an output terminal of the second comparator, and a second speaker having a first input terminal coupled to the output terminal of the first comparator, and a second input terminal coupled to an output terminal of the third comparator.

These and other objectives of the present invention will no doubt become obvious to those of ordinary skill in the art after reading the following detailed description of the preferred embodiment that is illustrated in the various figures and drawings.

Figure 1:
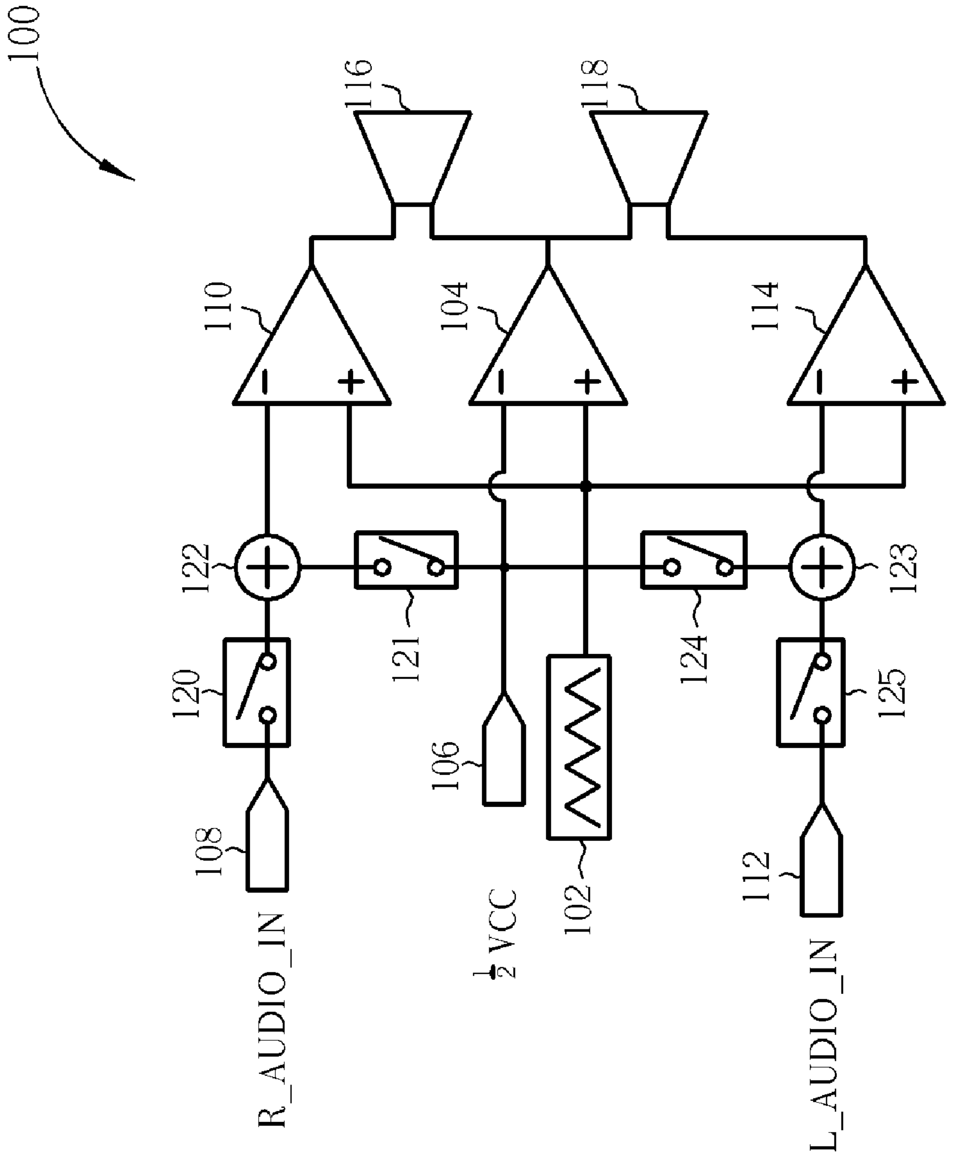
FIG. 1 is a diagram of a speaker system according to a first embodiment of the present invention.

and when only one of the audio signal sources illustrated in FIG. 1 is applied with input signals whereas the electrical level of the other one stays at ½ VCC.

Figure 2:
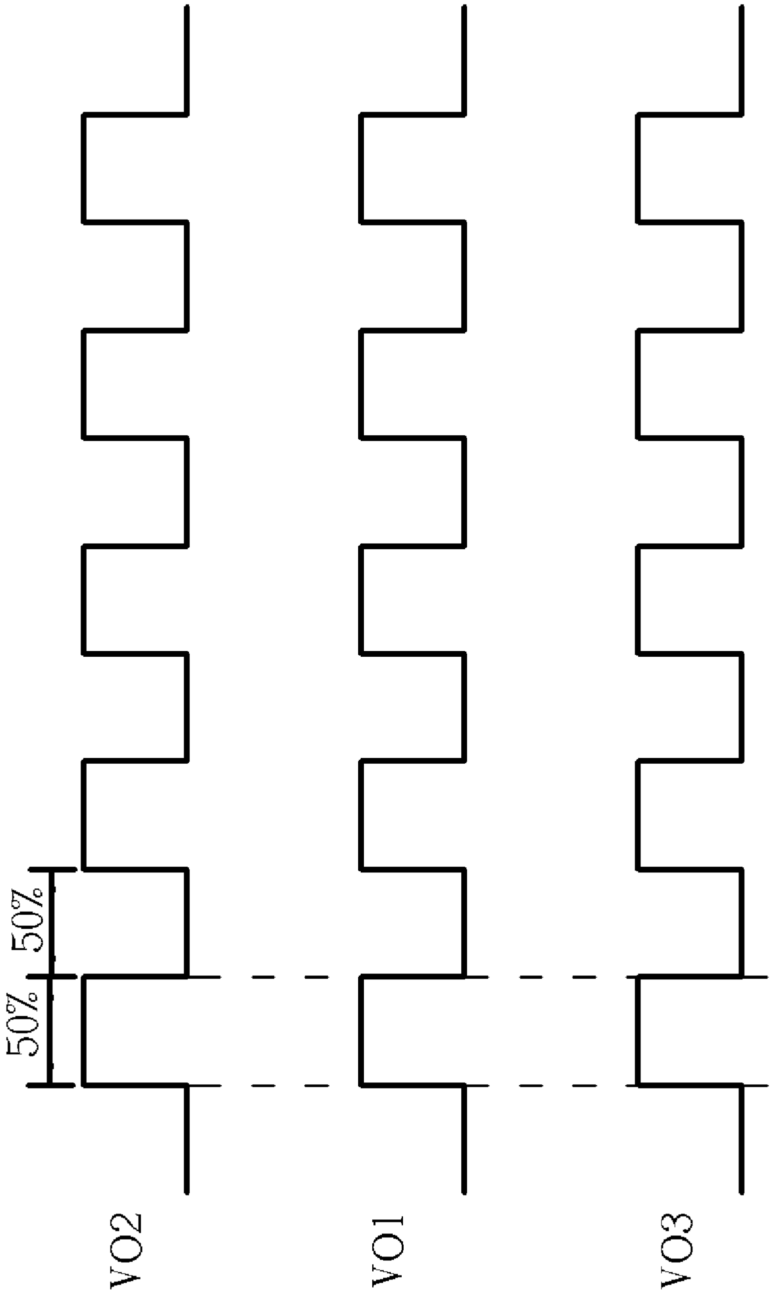
FIG. 2 is a schematic waveform diagram illustrating a square wave outputted from the first comparator, a square wave outputted from the second comparator, and a square wave outputted from the third comparator when the electrical level of the second signal source is ½ VCC, where voltage levels of both the first audio signal source and the second audio signal source stay at ½ VCC so that all outputted signals from the three comparators illustrated in FIG. 1 have square waves of a duty cycle 50%, and there are no phase differences nor timing differences between all the outputted signals.
Figure 4:
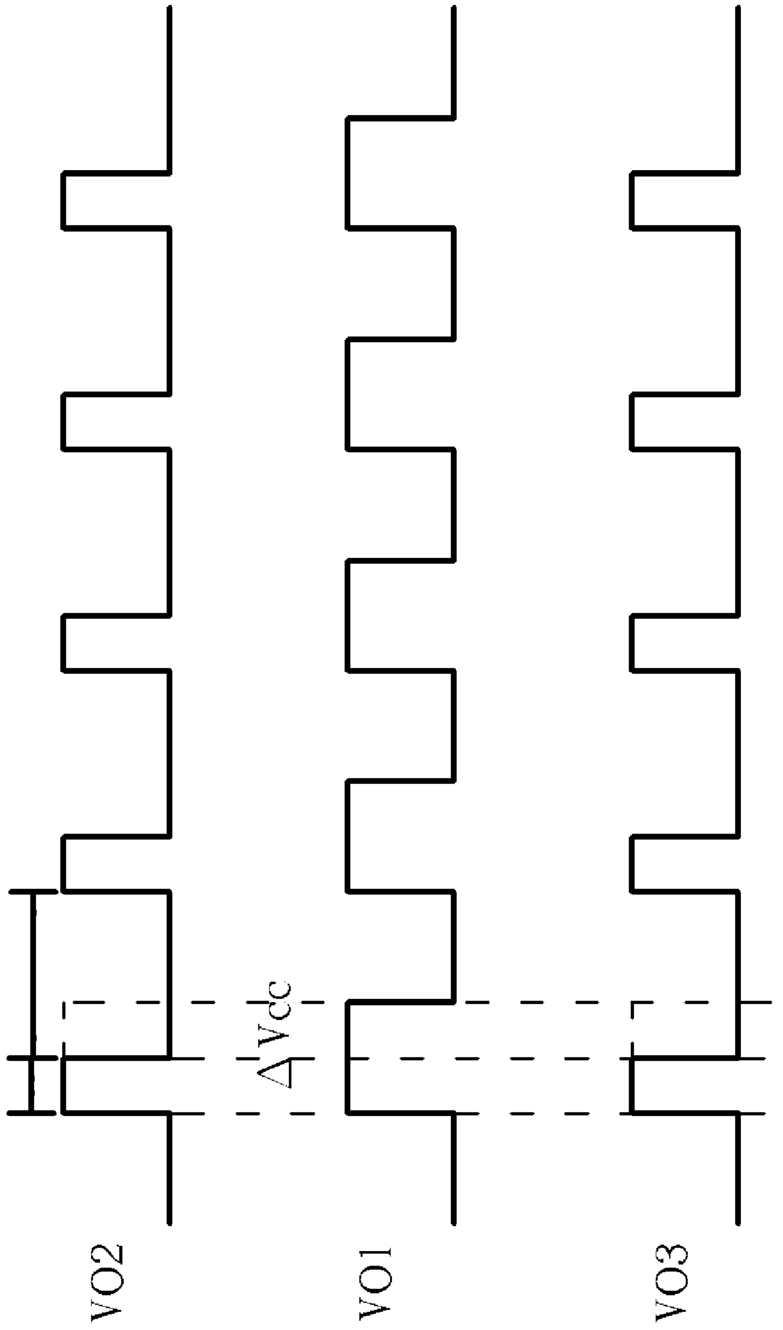

FIG. 4 is a schematic waveform diagram of the square waves shown in FIG. 2 when the electrical level of the second signal source is $$\frac{1}{2}VCC - \Delta VCC,$$

and when only one of the audio signal sources illustrated in FIG. 1 is applied with input signals whereas the electrical level of the other one stays at ½ VCC.

Figure 5:
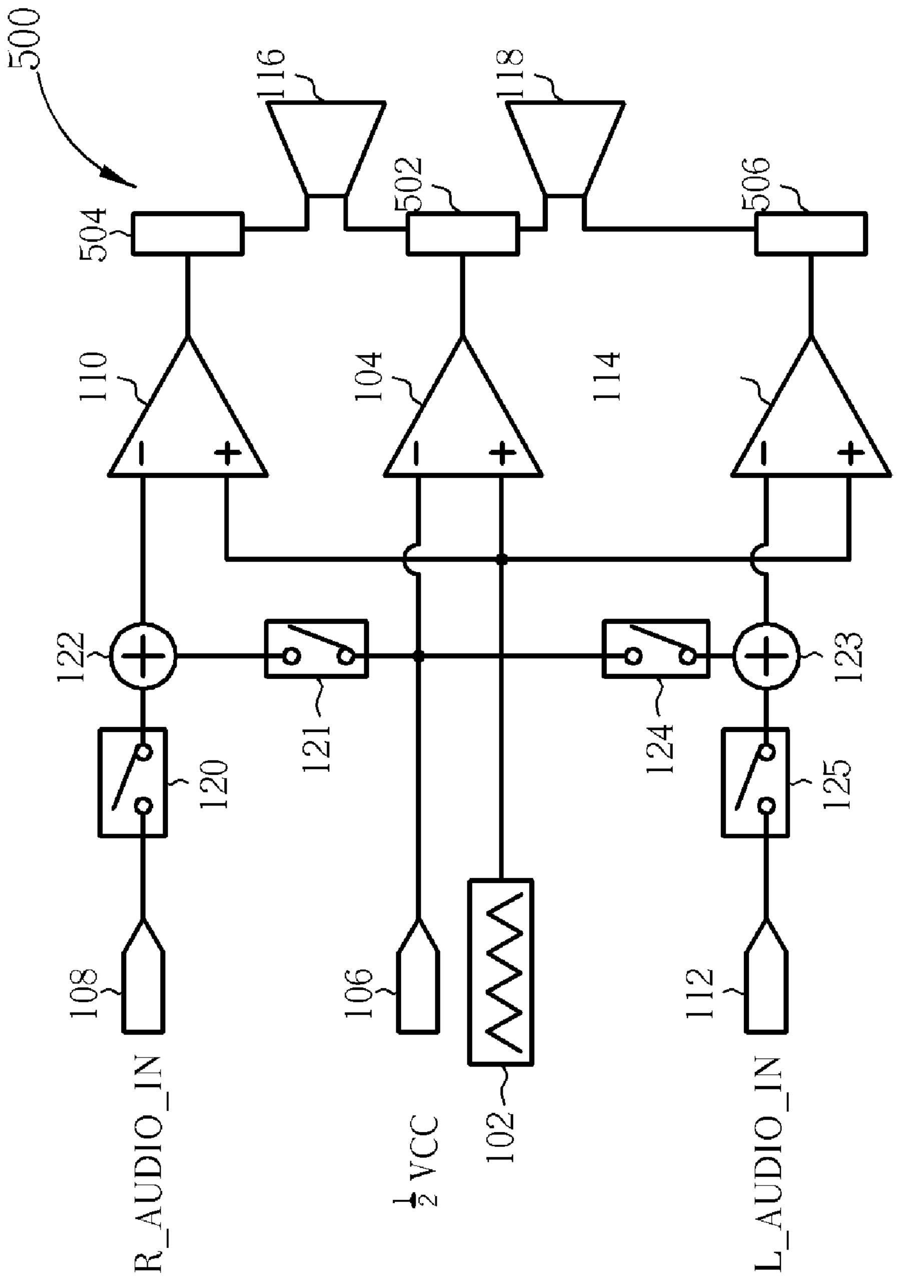

FIG. 5 is a diagram of a speaker system having a plurality of pre-drivers according to a second embodiment of the present invention.

DETAILED DESCRIPTION

For overcoming the abovementioned defects, a speaker system utilizing pulse width modulation signals is provided in the present invention for saving wasted power consumption led by continuously driving a speaker with a driving signal source when there are no audio signals in both the left ear channel and the right ear channel. Properties of pulse width modulation signals are also utilized for enhancing synchronism between audio signals from both the left ear channel and the right ear channel, where the audio signals relate to sounds outputted by the speaker and heard by a listener, so that related noise is reduced.

Please refer to FIG. 1, which is a diagram of a speaker system 100 according to a first embodiment of the present invention. As shown in FIG. 1, the speaker system 100 comprises a first signal source 102, a first comparator 104, a second signal source 106, a first audio signal source 108, a second comparator 110, a second audio signal source 112, a third comparator 114, a first speaker 116, a second speaker 118, a first switch 120, a second switch 121, a first mixer 122, a second mixer 123, a third switch 124, and a fourth switch 125. The first signal source 102 is a sawtooth signal source. A second signal source 106 is a DC signal source. The first signal source 102 is coupled to a positive input terminal of the first comparator 104, a positive input terminal of the second comparator 110 through both the second switch 121 and the first mixer 122, and a positive input terminal of the third comparator 114 through both the third switch 124 and the second mixer 123. The first audio signal source 108 is coupled to a negative input terminal of the second comparator 110 through both the first switch 120 and the first mixer 122, for inputting audio signals R_AUDIO_IN of the right ear channel as shown in FIG. 1. The second audio signal source 112 is coupled to a negative input terminal of the third comparator 114 through both the fourth switch 125 and the second mixer 123, for inputting audio signals L_AUDIO_IN of the left ear channel as shown in FIG. 1. The first speaker 116 has a first input terminal coupled to an output terminal of the first comparator 104, and a second input terminal coupled to an output terminal of the second comparator 110. The second speaker 118 has a first input terminal coupled to the output terminal of the first comparator 104, and a second input terminal coupled to an output terminal of the third comparator 114.

By inputting signals of both the first signal source 102 and the second signal source 106 into the first comparator 104, pulse width modulation signals are generated at the output terminal of the first comparator 104, and are inputted into both the first speaker 116 and the second speaker 118. As known by those who skilled in the art, waveforms of pulse width modulation signals are square waves. Similarly, square waves are also generated at both the output terminals of the second comparator 110 and the third comparator 114. Besides, with the aid of pulse width modulation signals outputted at the output terminal of the first comparator 104, a related analog ground may thus be generated easily for filtering out unnecessary noise. The second signal source 106 outputs signals having a constant electrical level so that output signals of the first comparator 104 are periodical. Moreover, the pulse width modulation signals outputted at the output terminal of the first comparator 104 are respectively utilized in the first speaker 116 and the second speaker 118 for driving audio signals outputted by each of the second comparator 110 and the third comparator 114. Therefore, a duty cycle of the audio signals outputted at the output terminals of both the second comparator 110 and the third comparator 114 may thus be adjusted, and no wasted power consumption is generated in both the first speaker 116 and the second speaker 118 since both said first speaker 116 and said second speaker 118 are regulated by the said duty cycle when there are no audio signals in both the first audio signal source 108 and the second audio signal source 112. An electrical level of the second signal source 106 may also be utilized for adjusting the duty cycle regulated by the pulse width modulation signals outputted from the first comparator 104. It indicates a fact that the electrical level of the second signal source 106 may be adjusted to a voltage other than ½ VCC according to various requirements about the duty cycle.

When the power supply voltage for driving both the first audio signal source 108 and the second audio signal source 112 is not stable, or when output currents from a preceding-stage Class D driver exceed predetermined limits, both the first switch 120 and the fourth switch 125 are disconnected so that audio signals from both the first audio signal source 108 and the second audio signal source 112 do not reach the first mixer 122 and the second mixer 123 respectively, and therefore, the audio signals do not reach the second comparator 110 and the third comparator 114 either. At this moment, the second switch 121 is activated so that the voltage of the second signal source 106, which is ½ VCC, is transmitted to the negative input terminal of the second comparator 110 through the first mixer 122, Similarly, the third switch 124 is also activated so that the voltage of the second signal source 106, which is ½ VCC, is also transmitted to the negative input terminal of the third comparator 114 through the second mixer 123. Under this condition, voltage levels of all the negative input terminals of the comparators 104, 110, and 114 are ½ VCC, and the same square wave is thus generated at all the output terminals of the comparators 104, 110, and 114. Therefore, there are no voltage differences between output voltages of the comparators 104, 110, and 114 according to the abovementioned arrangement illustrated in FIG. 1, and unwanted noises are thus prevented from being generated at the output terminals of the comparators 104, 110, and 114.

Figure 3:
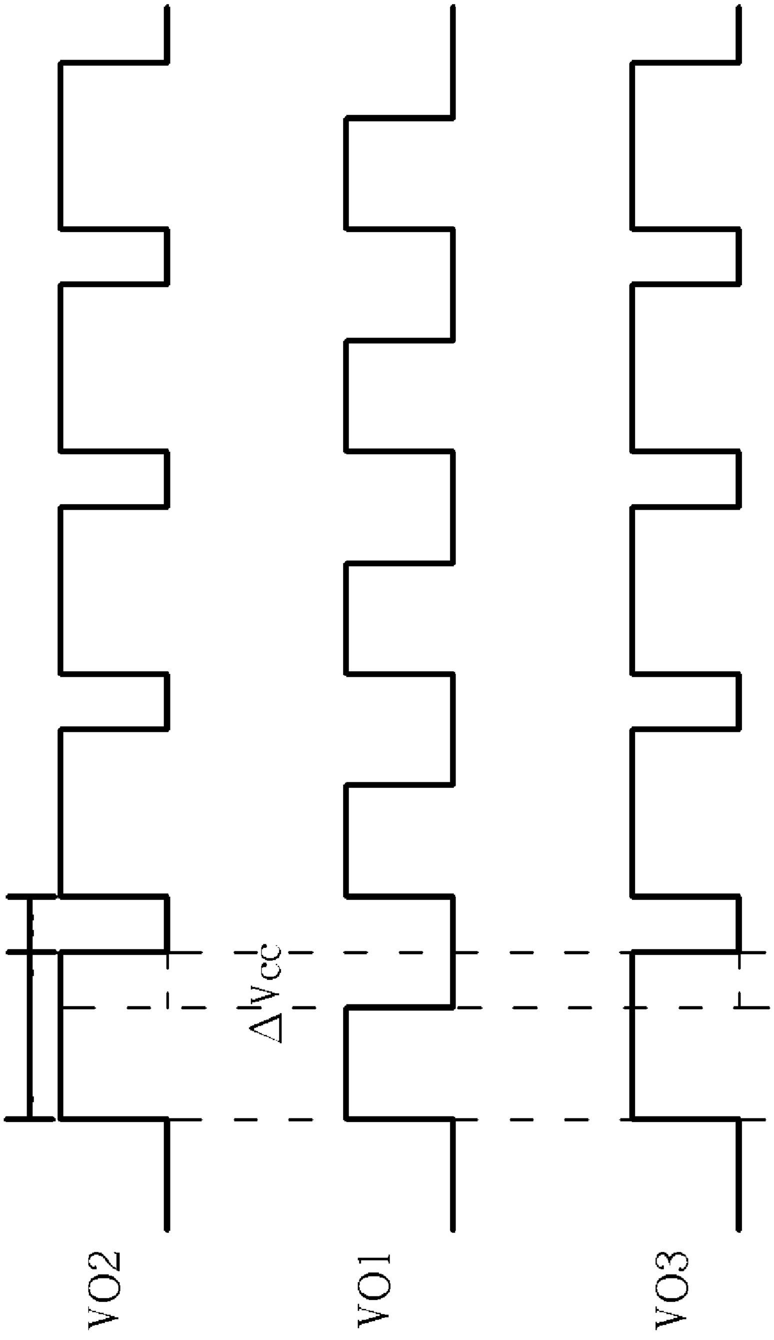
FIG. 3 is a schematic waveform diagram of the square waves shown in FIG. 2 when the electrical level of the second signal source is $$\frac{1}{2}VCC + \Delta VCC,$$

Please refer to FIG. 2, FIG. 3, and FIG. 4. FIG. 2 is a schematic waveform diagram illustrating a square wave VO1 outputted from the first comparator 104, a square wave VO2 outputted from the second comparator 110, and a square wave VO3 outputted from the third comparator 114 when the electrical level of the second signal source 106 is ½ VCC, where both the first audio signal source 108 and the second audio signal source 112 are assumed to continuously output audio signals. FIG. 3 is a schematic waveform diagram of the square waves shown in FIG. 2 when the electrical level of the second signal source 106 is $$\frac{1}{2}VCC + \Delta VCC.$$

FIG. 4 is a schematic waveform diagram of the square waves shown in FIG. 2 when the electrical level of the second signal source 106 is $$\frac{1}{2}VCC - \Delta VCC.$$

Note that ΔVCC is a voltage higher than 0 volts and lower than ½ VCC. As illustrated in FIG. 2, a duty cycle of the square wave VO1 is about 50%. As illustrated in FIG. 3 and corresponding to FIG. 2, an electrical level at the negative input terminal of the first comparator 104 is increased by ΔVCC, i.e., when the electrical level of the second signal source 106 is $$\frac{1}{2}VCC + \Delta VCC,$$

a period, during which the electrical level of the first signal source 102 is higher than ½ VCC, is shortened. It indicates a fact that a duty cycle of the pulse width modulation signals outputted at the output terminal of the first comparator 104 is shortened also. Therefore, as illustrated in FIG. 3, the duty cycle of the square wave VO1 in FIG. 3 is shorter than in FIG.

2, i.e., shorter than 50%. Besides, since the duty cycles of both the square waves VO2 and VO3 are regulated by the duty cycle of the square wave VO1, said duty cycles of both the square waves VO2 and VO3 are shortened as well. Similarly, as illustrated in FIG. 4, and corresponding to FIG. 2, the electrical level at the negative input terminal of the first comparator 104 is decreased by ΔVCC, i.e., when the electrical level of the second signal source 106 is $$\frac{1}{2}VCC + \Delta VCC,$$

a period, during which the electrical level of the first signal source 102 is higher than ½ VCC, is lengthened. And the duty cycle of the pulse width modulation signals outputted at the output terminal of the first comparator 104 is increased accordingly. At last, duty cycles of all of the square waves VO1, VO2, and VO3 are lengthened as well.

Note that the abovementioned descriptions about FIG. 2, FIG. 3, and FIG. 4 are described based on a fact that there are audio signals continuously outputted from both the first audio signal source 108 and the second audio signal source 112. When audio signals are outputted intermittently from both the first audio signal source 108 and the second audio signal source 112, the electrical levels of the square waves VO2 and VO3 illustrated in FIG. 2, FIG. 3, and FIG. 4 are intermittently varied as well. However, the electrical levels of the square waves VO2 and VO3 are still regulated by the illustrated duty cycles of both the square waves VO2 and VO3 in FIG. 2, FIG. 3, and FIG. 4. Besides, when there are no audio signals outputted from both the first audio signal source 108 and the second audio signal source 112, there is no wasted power consumption in the speaker system 100 shown in FIG. 1 as well. The abovementioned defect about synchronism among audio signal sources is thus relieved also, based on the fact that signals from the first signal source 102 are simultaneously inputted to all of the first comparator 104, the second comparator 110, and the third comparator 114.

Please refer to FIG. 5, which is a diagram of a speaker system 500 according to a second embodiment of the present invention. Compared with the speaker system 100 shown in FIG. 1, the speaker system 500 shown in FIG. 5 further comprises a first pre-driver 502, a second pre-driver 504, and a third pre-driver 506. The first pre-driver 502 has a first output terminal coupled to the first input terminal of the first speaker 116, and a second output terminal coupled to the first input terminal of the second speaker 118. The first pre-driver 502 is utilized for enhancing the pulse width modulation signals outputted from the first comparator 104. The second pre-driver 504 has an input terminal coupled to the output terminal of the second comparator 110, and an output terminal coupled to the second input terminal of the first speaker 116. The second pre-driver 504 is utilized for enhancing audio signals outputted from the second comparator 110, i.e., the audio signals from the first audio signal source 108. The third pre-driver 506 has an input terminal coupled to the output terminal of the third comparator 114, and an output terminal coupled to the second input terminal of the second speaker 118. The third pre-driver 506 is utilized for enhancing audio signals outputted from the third comparator 114, i.e., audio signals from the second audio signal source 112.

In the speaker system of the present invention, pulse width modulation signals are utilized for driving audio signals of a speaker, and are utilized for regulating duty cycles of both right ear channel and left ear channel in the speaker. Therefore, when there are no audio signals in both the right ear channel and the left ear channel, wasted power consumption is prevented with the aid of the regulations from the pulse width modulation signals. Moreover, the pulse width modulation signals and a signal source, which generates said pulse width modulation signals, are utilized for enhancing synchronism between audio signals of both the right ear channel and the left ear channel, where said audio signals are outputted from the speaker, and for reducing related noise to improve the audio quality of the speaker. Note that in a preferred embodiment of the present invention, an audio amplifier utilizing the speaker system of the present invention is a Class D amplifier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A speaker system of utilizing pulse width modulation signals for saving idling power consumption comprising:

a first signal source;

a first comparator having a positive input terminal coupled to the first signal source;

a second signal source coupled to a negative input terminal coupled to the first comparator;

a first audio input source;

a first switch having a first terminal coupled to the first audio input source;

a first mixer having a first input terminal coupled to a second terminal of the first switch;

a second comparator having a positive input terminal coupled to the first signal source, and a negative input terminal coupled to an output terminal of the first mixer;

a second switch having a first terminal coupled to the second signal source, and a second terminal coupled to a second input terminal of the first mixer;

a third switch having a first terminal coupled to the second signal source;

a second audio input source;

a fourth switch having a first terminal coupled to the second audio input source;

a second mixer having a first input terminal coupled to a second terminal of the fourth switch, and a second input terminal coupled to a second terminal of the third switch;

a third comparator having a positive input terminal coupled to the first signal source, and a negative input terminal coupled to an output terminal of the second mixer;

a first speaker having a first input terminal coupled to an output terminal of the first comparator, and a second input terminal coupled to an output terminal of the second comparator; and a second speaker having a first input terminal coupled to the output terminal of the first comparator, and a second input terminal coupled to an output terminal of the third comparator.

2. The speaker system of claim 1 further comprising:

a first pre-driver having an input terminal coupled to the output terminal of the first comparator, a first output terminal coupled to the first input terminal of the first speaker, and a second output terminal coupled to the first input terminal of the second speaker;

a second pre-driver having an input terminal coupled to the output terminal of the second comparator, and an output terminal coupled to the second input terminal of the first speaker; and a third pre-driver having an input terminal coupled to the output terminal of the third comparator, and an output terminal coupled to the second input terminal of the second speaker.

3. The speaker system of claim 1 wherein the first signal source is a sawtooth wave signal source.

4. The speaker system of claim 1 wherein the second signal source is a DC signal source.

5. The speaker system of claim 4 wherein an electrical level of the DC signal source is half of an electrical level of a DC voltage for biasing the speaker system.

* * * * *